United States Patent [19]

Jefferts

[11] Patent Number: 4,679,559
[45] Date of Patent: Jul. 14, 1987

[54] METHOD AND DEVICE FOR TAGGING A MACRO-ORGANISM

[75] Inventor: Keith B. Jefferts, Shaw Island, Wash.

[73] Assignee: Northwest Marine Technology Inc., Shaw Island, Wash.

[21] Appl. No.: 916,165

[22] Filed: Oct. 7, 1986

[51] Int. Cl.$^4$ .............................................. A61B 17/00
[52] U.S. Cl. ......................................... 128/330; 119/3; 40/300; 604/60
[58] Field of Search ......................... 128/330, 1.3–1.5; 119/3; 40/300; 604/57–60

[56] References Cited

U.S. PATENT DOCUMENTS

| 2,517,325 | 8/1950 | Lamb | 128/1.4 |
|---|---|---|---|
| 2,853,075 | 9/1958 | Hoffman et al. | 128/1.4 |
| 3,128,744 | 4/1964 | Jefferts et al. | |
| 3,313,301 | 4/1967 | Jefferts et al. | |
| 3,369,525 | 2/1968 | Debrotnic et al. | 604/57 |
| 3,545,405 | 12/1970 | Jefferts et al. | |
| 3,820,545 | 6/1974 | Jefferts | |
| 4,161,943 | 7/1979 | Nogier | 128/1.3 |
| 4,233,964 | 11/1980 | Jefferts et al. | |

FOREIGN PATENT DOCUMENTS

| 743502 | 11/1943 | Fed. Rep. of Germany | 128/1.4 |
|---|---|---|---|
| 443105 | 12/1948 | Italy | 128/1.4 |

Primary Examiner—C. Fred Rosenbaum
Assistant Examiner—Gene B. Kartchner
Attorney, Agent, or Firm—Kenyon & Kenyon

[57] ABSTRACT

In a method and apparatus for magnetizing an identification tag prior to insertion thereof into a host macro-organism, the tag is provided with a magnetic field having an orientation opposed to the magnetic field of an injection wire from which the tag has been cut. The tag and the leading end of the wire repel one another and facilitate implantation of the tag into the macro-organism by preventing withdrawal of the tag with the wire upon termination of an injection operation.

16 Claims, 13 Drawing Figures

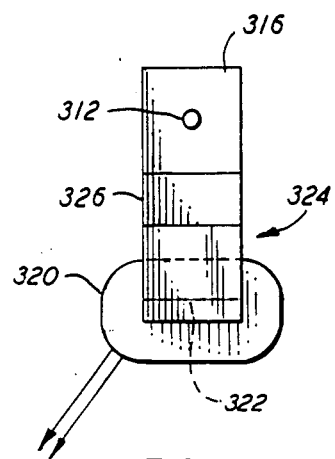
FIG. 3a
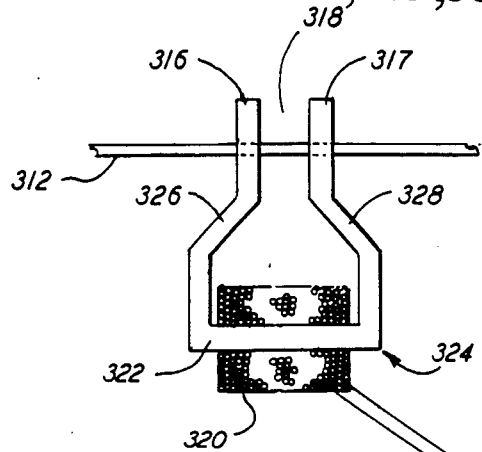
FIG. 3b
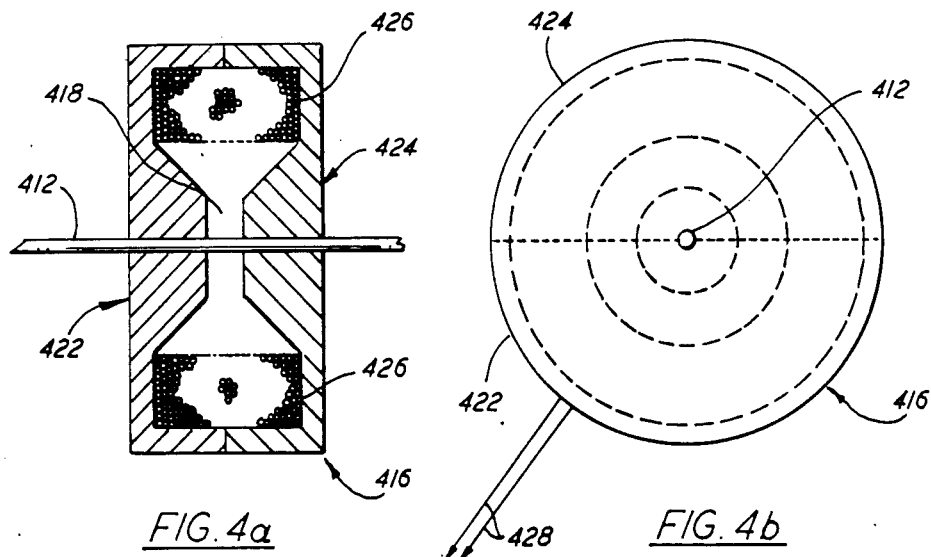
FIG. 4a
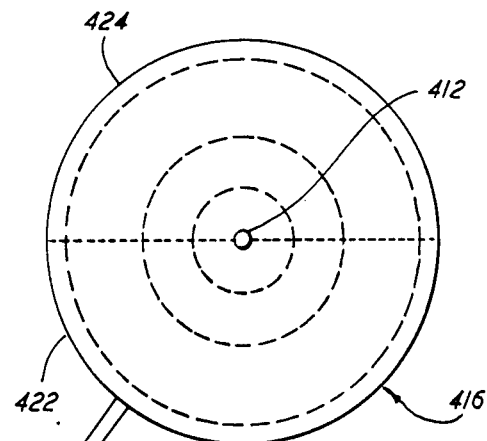
FIG. 4b
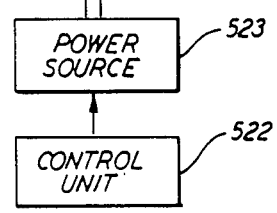

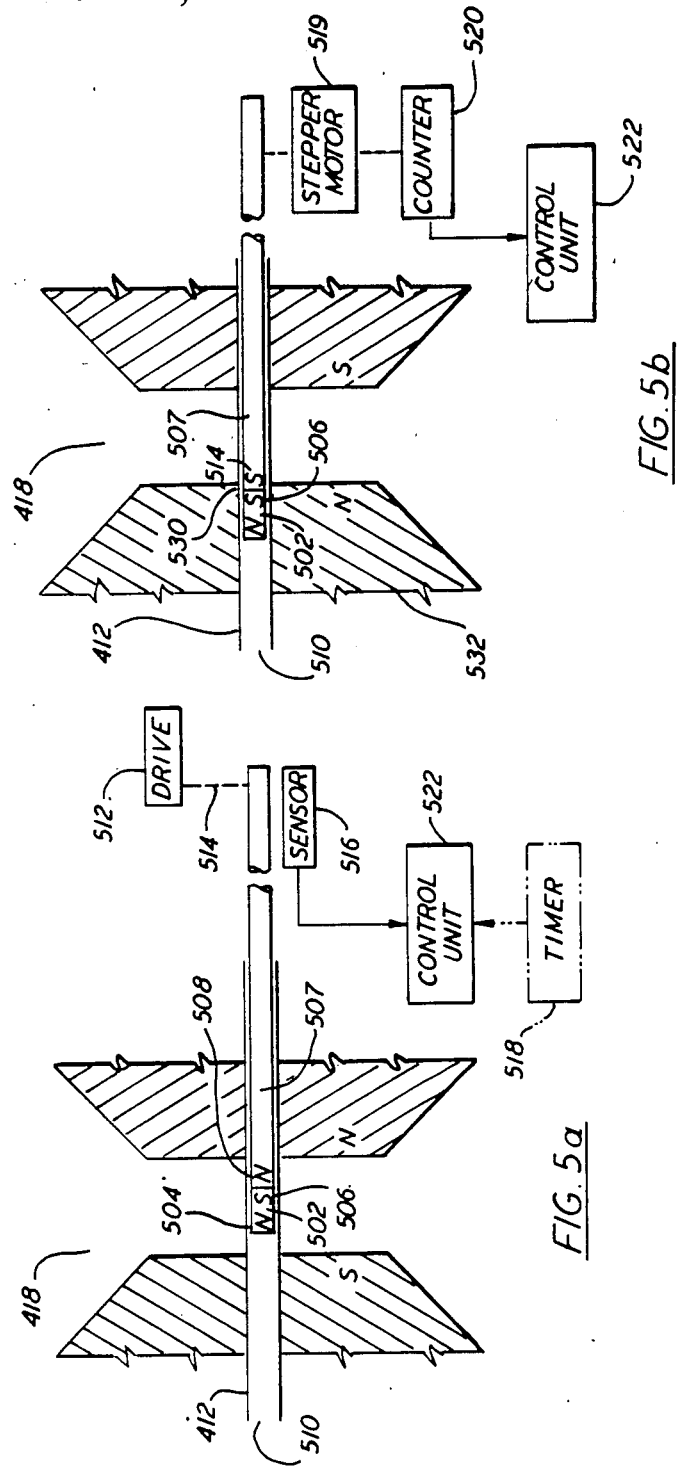

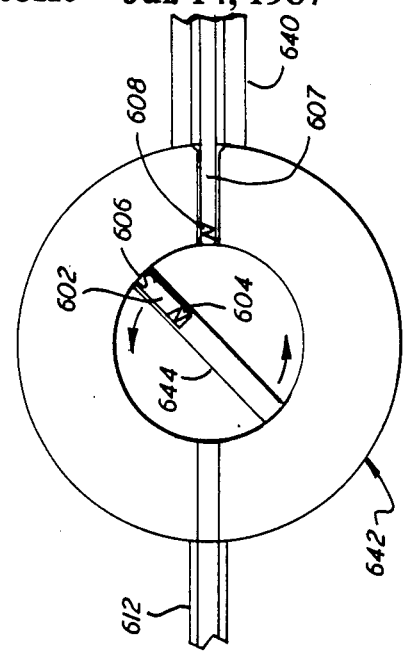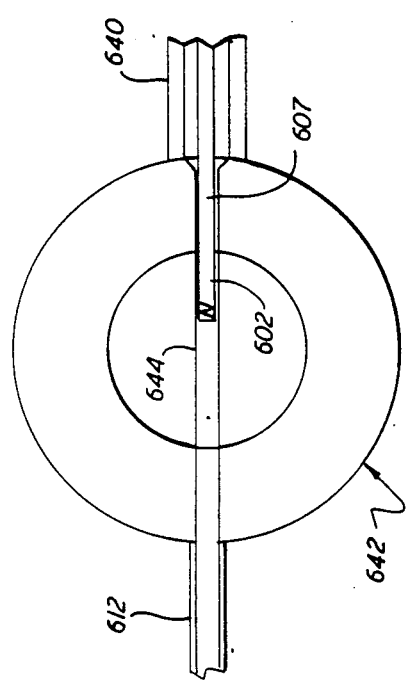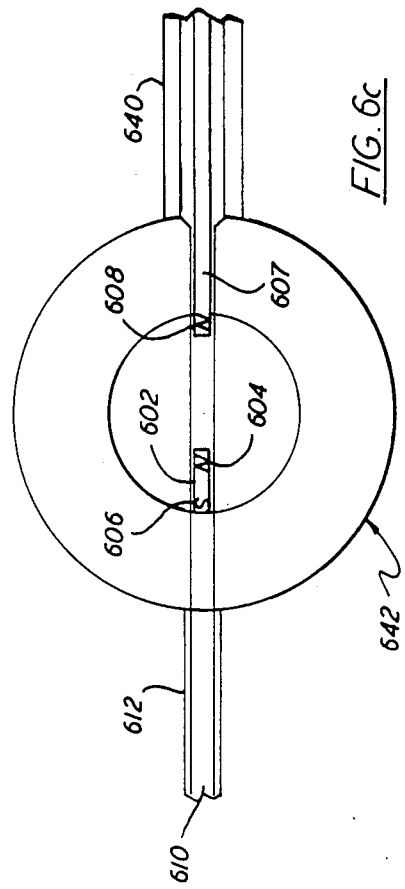

METHOD AND DEVICE FOR TAGGING A MACRO-ORGANISM

BACKGROUND OF THE INVENTION

This invention relates to tagging macro-organisms in order to facilitate research on the macro-organisms. More particularly, the invention relates to the injection into a macro-organism of a magnetized tag severed from a supply of wire and incrementally advanced to an implanting device.

U.S. Pat. No. 3,820,545 to Jefferts discloses a method and apparatus for implanting such tags. The tags are injected into macro-organisms in an unmagnetized state and subsequently magnetized in place for later detection. U.S. Pat. Nos. 3,128,744 and 3,313,301 issued to Bergman and Jefferts disclose earlier related prior art systems. The '744 patent discloses a small magnetically coded tag, while the '301 patent is directed to an instrument for implanting such tags.

FIG. 1b illustrates a prior art magnetizer of the kind for magetizing tags after implantation. A tagged specimen is guided, in the direction indicated by an arrow 154, through a permanent magnet toroid 150 having a downstream magnetic flux shield 152 usually made of soft iron. The shield 152 is necessary to prevent demagnetization of the tag as the fish in which the tag is implanted passes out of the magnetizing field.

One alternative to magnetizing a tag inside the organism is to reduce the size of the magnetizer and install it around the injection needle, so that the magnetizer works to magnetize the tag before implantation. FIG. 1a shows an unsatisfactory permanent magnet toroid 160 for accomplishing such a magnetization subsequent to implantation. A fringing field 162 has a direction opposite to the direction of a primary field 164 in a transverse plane passing through the geometric center of the toroid. As a result a tag magnetized by the primary field tends to become demagnetized by the fringing field upon passage of the tagged fish beyond the toroid. This approach has the additional shortcoming that the magnetizer magnetizes both the tag and the wire with the consequence that the tag is attracted to the wire and may be accidentally extracted from the specimen as the needle and wire are withdrawn after tagging.

An object of the present invention is to provide an improved method and apparatus of the above-described type wherein a tag is magnetized prior to injection into a macro-organism.

Another object of the present invention is to provide an improved method and apparatus for forming a magnetized tag and injecting the tag into a macro-organism.

Another, more particular, object of the present invention is to provide such an improved method and apparatus wherein magnetic attraction between a magnetized tag and an injecting wire is eliminated to prevent of the tag from a macro-organism upon completion of an implantation operation.

SUMMARY OF THE INVENTION

The invention involves a method for tagging a macro-organism, including the step of forming from one end of a wire a tag having a magnetic field with a first orientation. The method further includes the step of injecting the tag into body tissues of the macro-organism by pushing the tag with the wire through a hollow injection needle, the wire having, upon formation of the tag, a leading end with a magnetic field having a second orientation. The improvement in a method in accordance with the present invention comprises the step of setting the first orientation and the second orientation to be opposite to one another at least in a region about a rear end of the tag and the leading end of the wire at least immediately prior to and immediately after injection of the tag into the macro-organism. As a result of this improvement, the leading end of the wire repels the tag and prevents the tag from being withdrawn from the body tissues of the macro-organism together with the wire upon termination of an implantation operation.

A method for tagging a macro-organism comprises, in accordance with a particular embodiment of the invention, the steps of (a) severing an end portion of a wire, (b) magnetizing the severed end portion to form a tag having a magnetic field with a first orientation, and (c) upon the severing of the wire's end portion, providing a leading end of the wire with a magnetic field having a second orientation. In a further step (d), the tag is injected into body tissues of the macro-organism by pushing the tag with the wire through a hollow injection needle itself partially inserted into the macro-organism's body tissues. In yet another step (e), the first orientation and the second orientation are set to be opposite to one another at least in a region about a rear end of the tag and the leading end of the wire immediately prior to and immediately after injection of the tag into the macro-organism, whereby the leading end of the wire repels the tag and thereby prevents the tag from being withdrawn from the macro-organism together with the wire.

In yet another particular embodiment of the invention, a method for tagging a macro-organism comprises the steps of (a) magnetizing one end of a wire, (b) severing an end portion of the magnetized end of the wire to form a tag having a magnetic field with a first orientation, the wire having upon completion of the severing step a leading end with a magnetic field having a second orientation, and (c) rotating the tag about an axis substantially transverse to a longitudinal axis of the wire so that the first orientation and the second orientation are opposite to one another at least in a region about a rear end of the tag and the leading end of the wire. The tag is injected into body tissues of the macro-organism by pushing the tag with the wire through a hollow injection needle itself inserted into the macro-organism's body tissues.

Pursuant to another embodiment of the invention, a device for tagging a macro-organism comprises a hollow injection needle at least partially insertable into body tissues of the macro-organism, the needle partially defining a path of motion of a wire at least partially disposable in the needle for pushing a tag through the needle. The needle has an inner diameter larger than an outer dimension of the tag and the wire. A cutting device is located along the wire path for severing an end portion from a leading end of the wire, while a magnet assembly is located along the path for magnetizing the end portion of the wire. The magnetized and severed wire end portion constitutes the tag and has a magnetic field with a first orientation. The leading end of the wire has, upon formation of the tag, a magnetic field with a second orientation. A drive mechanism is engageable with the wire for moving the wire through the needle to thereby push the tag into body tissues of the macro-organism upon a partial insertion of the needle into the body tissues. A control, operatively connected to at least one of magnet assembly and the cutting device, sets the first orientation and the second orientation to be opposite to one another at least in a region about a rear end of the tag and the leading end of the wire immediately prior to and immediately after injection of the tag into the macro-organism, whereby the leading end of the wire repels the tag and thereby prevents the tag from being withdrawn from the body tissues of the macro-organism together with the wire.

BRIEF DESCRIPTION OF THE DRAWING

FIG. 3a is a front elevational view of a magnetizer according to the present invention.

FIG. 3b is a side elevational view of the magnetizer shown in FIG. 3a.

FIG. 4a is a longitudinal cross-sectional view of an alternate magnetizer according to the present invention.

FIG. 4b is of an axial view of the magnetizer shown in FIG. 4a.

FIG. 5a is a detailed partial cross-sectional of the magnetizer of FIG. 4, showing the tag and wire passing through the magnetizing gap.

FIG. 5b is a view similar to FIG. 5a, showing the tag as it passes out of the magnetizing gap.

FIG. 6a is a longitudinal cross-sectional view of another embodiment of the present invention, illustrating a rotary shear prior to a cutting operation.

FIG. 6b shows the apparatus of FIG. 6a upon a shearing of a tip from a magnetized tag wire.

FIG. 6c shows the apparatus of FIGS. 6a and 6b with the rotating shear rotated 180° from the position shown in FIG. 6a, whereby the tag has a direction of magnetization opposite to the direction of magnetization of the wire.

DESCRIPTION OF PREFERRED EMBODIMENTS

Figure 1A:
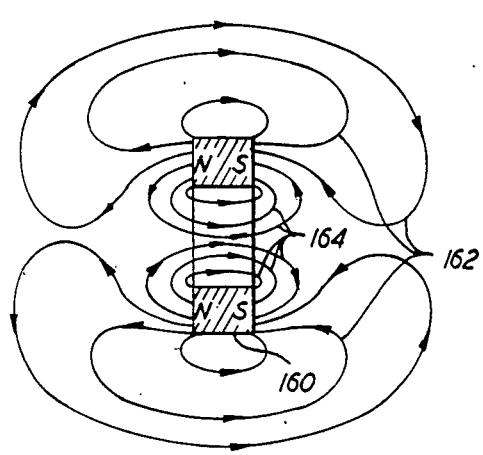
FIG. 1a is a longitudinal cross-sectional view of a toroidal prior art magnetizer.
Figure 1B:
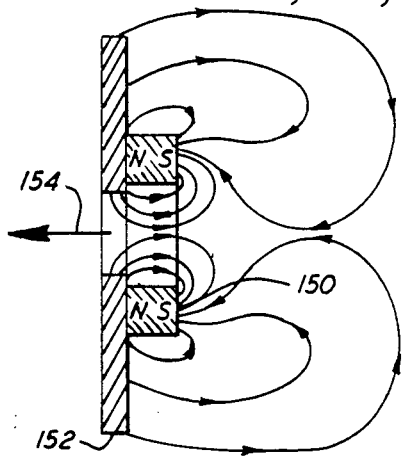
FIG. 1b is a longitudinal cross-sectional view of another prior art magnetizer which magnetizes tags after their insertion into macro-organisms.

As illustrated in FIG. 1b, a conventional tag magnetizer used for magnetizing identification tags upon implantation thereof into specimens such as fish comprises a permanent magnet toroid 150 provided on a downstream side with a magnetic flux shield 152. Magnetization is accomplished upon movement of the tagged specimens through the toroid and shield in an axial direction indicated by arrow 154.

Figure 2A:
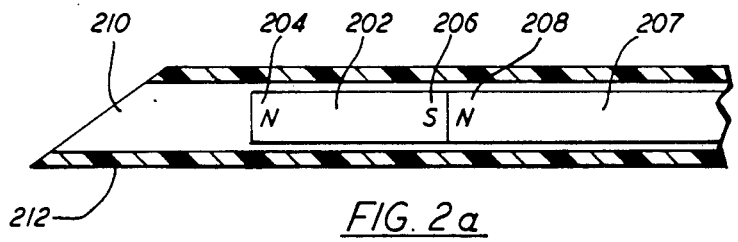
FIG. 2a is a longitudinal cross-sectional view of an injection needle containing a magnetized tag with the same direction of magnetization as an injection wire.

If the prior art magnetizer of FIG. 1b is reduced in size and placed around an injection needle 212 (FIGS. 2a and 2b) in order to magnetize a tag 202 prior to implantation thereof into the body tissues of a macro-organism, tag 202 and a metal injection wire 207 used for pushing the tag into the macro-organism's body tissues are provided with magnetic field orientations such as those indicated in FIG. 2a. Specifically, tag 202 has a magnetic field with a north pole 204 and an associated south pole 206, while wire 207 has a north pole 208 and a corresponding south pole (not illustrated). Both tag 202 and a leading end of wire 207 are contained within an elongate chamber 210 of injection needle 212. South pole 206 of tag 202 is immediately adjacent to north pole 208 of wire 207, whereby tag 202 will tend to adhere to the leading end of wire 207 and to be withdrawn therewith from a specimen upon the termination of an injection operation.

Figure 2B:
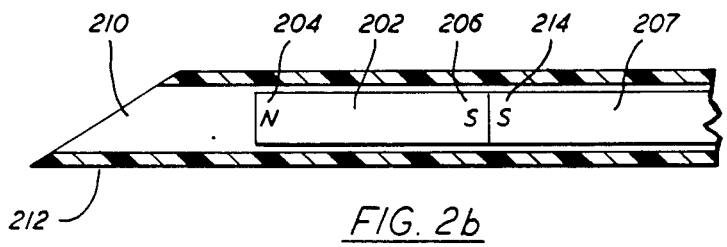
FIG. 2b is a view similar to FIG. 2a, showing a magnetized tag with a direction of magnetization opposite to the magnetization of an injection wire.

As illustrated in FIG. 2b, one way of avoiding the withdrawal of tag 202 with wire 207 owing to magnetic attraction between opposite poles is to control or set the magnetic fields of tag 202 and wire 207 so that a rear end of tag 202 has a magnetic pole identical in polarity to a magnetic pole at a forward end of wire 207. For example, as illustrated in FIG. 2b, south pole 206 of tag 202 may be disposed adjacent to a south pole 214 generated at the forward end of wire 207. In accordance with the magnetic field orientations illustrated in FIG. 2b, tag 202 is repelled by wire 207 and is, therefore, not likely to be retracted or withdrawn therewith upon the termination of an injection operation.

As illustrated in FIGS. 3a and 3b, a magnetizer for providing a leading end of injection wire 207 with a magnetic pole 214 of the same type as magnetic pole 206 at the rear end of tag 202 immediately prior to and upon the injection of tag 202 into a macro-organism's body tissues comprises a magnetic coil 320 wrapped around a central portion 322 of a magnetic core 324 made of iron, ferrite or alloy. Core 324 includes a pair of legs 326 and 328 having respective end portions 316 and 317 parallel to and spaced from one another to form a magnetizing gap 318. An injection needle 312 preferably made of a non-magnetic material such as beryllium copper or a marginally magnetic material such as 316 Series stainless steel traverses end portions 316 and 317 of core legs 326 and 328, as well as magnetizing gap 318.

Another magnetizer 416, shown in FIGS. 4a and 4b, for providing a leading end of an injection wire with a magnetic pole identical to the magnetic pole at the rear end of the identification tag comprises a pair of structurally identical iron, ferrite or alloy members 422 and 424 facing one another to form a magnetic gap 418. Members 422 and 424 surround an energizing coil 426 wound on a bobbin (not illustrated. An injection needle 412 made of a non-magnetic material such as beryllium copper or a marginally magnetic material such as 316 Series stainless steel is disposed along an axis of symmetry of members 422 and 424 and energizing coil 426 and traverses members 422 and 424 and gap 418. Energizing coil 426 is provided with a pair of energizing leads 428.

FIG. 5a is a detailed view of a portion of FIG. 4a and shows an identification tag 502 and a leading end of an injection wire 507 positioned within magnetizing gap 418. Tag 502 has entered the gap 418 from the right side of FIG. 5a from a cutting mechanism (not illustrated) located upstream of magnetizer 116 along the injection path partially defined by needle 412. Tag 502 is formed by magnetizing to saturation a wire segment which has been severed from the leading end of wire 507 by the cutting mechanism disposed upstream from magnetizer 416.

Preferably, the cutting mechanism (similar to that illustrated in FIG. 6a) and magnetizer 416 are stationary, while needle 502 is shiftable. Needle 502 has an upstream end (see needle 612 in FIG. 6a) disposed at an outlet of the cutting mechanism for receiving the severed wire end portion therefrom.

Coil 426 (FIG. 4b) is energized by a current transmitted through wires 428 prior to or upon the arrival of the severed wire segment at magnetizing gap 418. While the severed wire portion is located within gap 418 as illustrated in FIG. 5a, the severed portion is magnetized to have a north magnetic pole 504 and a south magnetic pole 506, thereby forming tag 502. Simultaneously, the leading end of wire 507 has been magnetized to have a north pole 508.

Tag 502 is pushed through gap 418 by injection wire 507 under the action of a drive mechanism 512 which is operatively connected to or engaged with wire 507, as indicated at 514 in FIGS. 5a and 5b. Advantageously, the motion of the severed wire portion into gap 418 and the motion of tag 502 through and away from gap 418 is a continuous operation monitored by a motion sensor 516 (FIG. 5a), timed by a timer 518 (FIG. 5b) or monitored by a counter 520 (FIG. 5b), the counter detecting stepping pulses provided to drive 512 in the case that the drive includes a stepper motor 519. Preferably, drive 512 takes the form of a pair of counterrotating rollers (not shown) driven by stepper motor 519 and the arrival of tag 502 at a critical position shown in FIG. 5b is detected through the monitoring of stepping pulses. Other devices for detecting the motion of injection wire 507 and the arrival of tag 502 in the position illustrated in FIG. 5b will be readily conceived by one or ordinary skill in the art.

The motion detector, whether in the form of motion sensor 516, timer 518 or counter 520, is operatively connected to a control device 522 in turn coupled to a power source 523 connected to leads 428 (FIG. 4a) for reversing the flow of current through coil 426 and thereby reversing the direction of a magnetizing field applied through members 422 and 424 at magnetizing gap 418.

In the critical position illustrated in FIG. 5b, tag 502 is shielded by a high permeability pole piece 532 of magnetic member 402. Accordingly, the magnetic field of tag 502 is not reversed or seriously reduced upon the reversal of the magnetic field in magnetizing gap 418. Tag 502 retains a magnetic pole, e.g., a north magnetic pole 504, at its forward end and a south magnetic pole 506 at its rear end. However, the reversal of the magnetizing field effectuates a magnetization of wire 507 so that the leading end thereof has a magnetic pole with the same identity or direction as the magnetic pole at the rear end of tag 502. In particular, as illustrated in FIGS. 5a and 5b, the leading end of injection wire 507 may be remagnetized to have a south magnetic pole 514 instead of a north magnetic pole 508 as generated upon the arrival of tag 502 and the leading end of wire 507 at magnetizing gap 418.

In the embodiments of the present invention illustrated and described with respect to FIGS. 3a, 3b, 4a, 4b, 5a and 5b, the discussion of FIGS. 5a and 5b being applicable in part also to the particular structure illustrated in FIGS. 3a and 3b, magnetization of the tag and reverse magnetization of the leading end of the rejection wire take place subsequently to a severing operation whereby a tag blank is severed from the leading end of the wire. In accordance with another embodiment of the present invention illustrated in FIGS. 6a, 6b, 6c, severing of the leading end of a wire 607 is performed after a magnetization step. A magnetizer such as that illustrated in FIGS. 3a and 3b or FIGS. 4a and 4b, is disposed upstream of a cutting device shown in FIGS. 6a, 6b and 6c. Wire 607 is conducted from the magnetizer to the cutting device through a wire guide 640. Upon the positioning of a leading end portion 602 of wire 607 within a rotatable component 644 of a rotary shear 642, as illustrated in FIG. 6a, the rotatable component is pivoted, as illustrated in FIG. 6b. to sever leading end portion 602 from wire 607. Rotation continues until rotatable component 644 and leading end portion or tag 602 have been rotated through an angle of 180° about an axis extending substantially perpendicularly to the injection path defined by wire 607 and an injection needle 612 connected to rotary shear 642 at an outlet end thereof. Upon the rotation of rotatable component 644 and tag 602 through the 180° angle, the end state of which rotation is illustrated in FIG. 6c, wire 607 is shifted longitudinally by a drive (e.g., drive 512 in FIG. 5a) to push tag 602 through rotary shear 642 and injection needle 612 and into the body tissues of a macro-organism (not shown). Prior to an injection stroke of wire 607, needle 612 is moved away from shear 642 and a forward or distal end of the needle penetrates into body tissues of the specimen.

The rotation of tag 602 upon the severing thereof from the leading end of wire 607 provides tag 602 and the leading end of wire 607 with magnetic fields having opposite orientations. In particular, tag 602 has a magnetic field with a north magnetic pole 604 and a south magnetic pole 606 at a rear end and a forward end of the tag, respectively, while wire 608 has a magnetic field with a north pole 608 at the leading end of the wire. Accordingly, the tag and the wire repel one another, thereby facilitating withdrawal of wire 607 alone and the implantation of tag 602 into the host macro-organism.

Although the invention has been described in terms of particular embodiments and applications, one of ordinary skill in the art, in light of this teaching, can generate additional embodiments and modifications without departing from the spirit of or exceeding the scope of the claimed invention. Accordingly it is to be understood that the descriptions and illustrations herein are proffered by way of example to facilitate comprehension of the invention and should not be construed to limit the scope thereof.

What is claimed is:

1. In a method for tagging a macro-organism, including the step of forming from one end of a wire a tag having a magnetic field with a first orientation, said method further including the step of injecting said tag into body tissues of the macro-organism by pushing said tag with said wire through a hollow injection needle, said wire having, upon formation of said tag, a leading end with a magnetic field having a second orientation, the improvement comprising the step of:

setting said first orientation and said second orientation to be opposite to one another at least in a region about a rear end of said tag and said leading end of said wire immediately prior to and immediately after injection of said tag into the macro-organism, whereby said leading end of said wire repels said tag and thereby prevents said tag from being withdrawn from the body tissues of the macro-organism together with said wire.

2. The method defined in claim 1 wherein said step of forming includes the steps of severing a forward end portion of said wire and subjecting the severed end portion to a first magnetizing field having a first predetermined orientation, said step of setting including the step of subjecting said leading end of said wire to a second magnetizing field having a second predetermined orientation opposed to said first predetermined orientation.

3. The method defined in claim 2 wherein said step of forming further includes the step of pushing said wire and said severed end portion through said first magnetizing field, said step of setting further including the step of generating said second magnetizing field by reversing the orientation of said first magnetizing field upon the attainment of a predetermined position by said severed end portion relative to said first magnetizing field.

4. The method defined in claim 2, further comprising the step of shielding said tag from said second magnetizing field.

5. The method defined in claim 1 wherein said step of forming includes the steps of subjecting said one end of said wire to a magnetizing field and subsequently severing an end portion of said wire at said one end to thereby form said tag, said step of setting including the step of rotating said tag substantially 180° about an axis substantially transverse to a longitudinal axis of said wire.

6. A method for tagging a macro-organism, comprising the steps of:
severing an end portion of a wire;
magnetizing the severed end portion to form a tag having a magnetic field with a first orientation;
providing a leading end of said wire, upon formation of said severed end portion, with a magnetic field having a second orientation;
injecting said tag into body tissues of the macro-organism by pushing said tag with said wire through a hollow injection needle itself partially inserted into said body tissues;
setting said first orientation and said second orientation to be opposite to one another at least in a region about a rear end of said tag and said leading end of said wire immediately prior to and immediately after injection of said tag into the macro-organism, whereby said leading end of said wire repels said tag and thereby prevents said tag from being withdrawn from said body tissues together with said wire; and
withdrawing said wire and said needle from said body tissues.

7. The method defined in claim 6 wherein said step of magnetizing includes the step of subjecting said tag to a first magnetizing field having a first predetermined orientation, said step of providing including the step of subjecting said leading end of said wire to a second magnetizing field having a second predetermined orientation, said step of setting including the step of controlling said second pretermined orientation to be opposed to said first orientation.

8. The method defined in claim 7, further comprising the step of pushing said severed end portion by means of said wire through said first magnetizing field, said step of controlling including the step of generating said second magnetizing field by reversing the orientation of said first magnetizing field upon attainment of a predetermined position by said severed end portion relative to said first magnetizing field.

9. The method defined in claim 8, further comprising the step of shielding said tag from said second magnetizing field.

10. A method for tagging a macro-organism, comprising the steps of:
magnetizing one end of a wire;
severing an end portion of said one end of said wire to form a tag having a magnetic field with a first orientation, said wire having upon said step of severing a leading end with a magnetic field having a second orientation;
rotating said tag about an axis substantially transverse to a longitudinal axis of said wire so that said first orientation and said second orientation are opposite to one another at least in a region about a rear end of said tag and said leading end of said wire;
injecting said tag into body tissues of the macro-organism by pushing said tag with said wire through a hollow injection needle itself inserted into said body tissues; and
removing said wire and said needle from said body tissues.

11. The method defined in claim 10 wherein said step of rotating comprises the step of rotating said tag through an angle of approximately 180°.

12. A device for tagging a macro-organism, comprising:
a hollow injection needle at least partially insertable into body tissues of the macro-organism;
a wire at least partially disposable in said needle for pushing a tag through said needle, said needle having an inner diameter larger than an outer dimension of said tag and said wire, said needle and said wire defining an injection path;
means located along said path for severing an end portion from a leading end of said wire;
means located along said path for magnetizing said end portion, the magnetized and severed end portion constituting said tag, said tag having a magnetic field with a first orientation, said leading end of said wire having, upon formation of said tag, a magnetic field with a second orientation;
means engageable with said wire for moving said wire through said needle to thereby push said tag into body tissues of the macro-organism upon a partial insertion of said needle into said body tissues; and
means, operatively connected to at least one of said means for magnetizing and said means for severing, for setting said first orientation and said second orientation to be opposite to one another at least in a region about a rear end of said tag and said leading end of said wire immediately prior to and immediately after injection of said tag into the macro-organism, whereby said leading end of said wire repels said tag and thereby prevents said tag from being withdrawn from the body tissues of the macro-organism together with said wire.

13. The device defined in claim 12 wherein said means for magnetizing is located downstream of said means for severing, whereby said end portion is first severed and subsequently magnetized, said means for magnetizing including means for producing a first magnetizing field having a first orientation for magnetizing the severed end portion, said means for setting including means for producing a second magnetizing field by reversing the orientation of said first magnetizing field upon the attainment of predetermined position by said severed end portion relative to said first magnetizing field, whereby said second orientation is opposed to said first directional orientation.

14. The device defined in claim 13, further comprising means for shielding said tag from said second magnetizing field.

15. The device defined in claim 12 wherein said means for magnetizing is located upstream of said means for severing, whereby said end portion is first magnetized and subsequently severed, said means for setting including means for rotating the magnetized and severed end portion substantially 180° about a transverse axis extending substantially perpendicularly to said path.

16. The device defined in claim 15 wherein said means for severing includes a rotatable member and drive means for rotating same about said transverse axis, said means for setting being operatively connected to said drive means for rotating said rotatable member about said transverse axis upon a positioning of the magnetized end portion of said wire at an upstream end portion of said rotatable member.

* * * * *

UNITED STATES PATENT AND TRADEMARK OFFICE
CERTIFICATE OF CORRECTION

PATENT NO. : 4,679,559
DATED : July 14, 1987
INVENTOR(S) : Keith B. Jefferts

It is certified that error appears in the above-identified patent and that said Letters Patent is hereby corrected as shown below:

Column 1, line 57, change "prevent of" to --prevent extraction of--.
Column 3, line 32, insert --view-- after "cross-sectional".
Column 5, line 25, change "or" to --of--; line 57, change "rejec-" to --injec---; line 67, change "thrcough" to --through--.
Claim 12, line 21, change "bc,dy" to --body--.
Claim 14, line 2, change "fcr" to --for--.

Signed and Sealed this

Twenty-sixth Day of April, 1988

Attest:

DONALD J. QUIGG

*Attesting Officer*   *Commissioner of Patents and Trademarks*